Aug. 21, 1951 — O. G. VOGEL ET AL — 2,565,443
ELECTRIC HOT PLATE
Filed Nov. 4, 1947
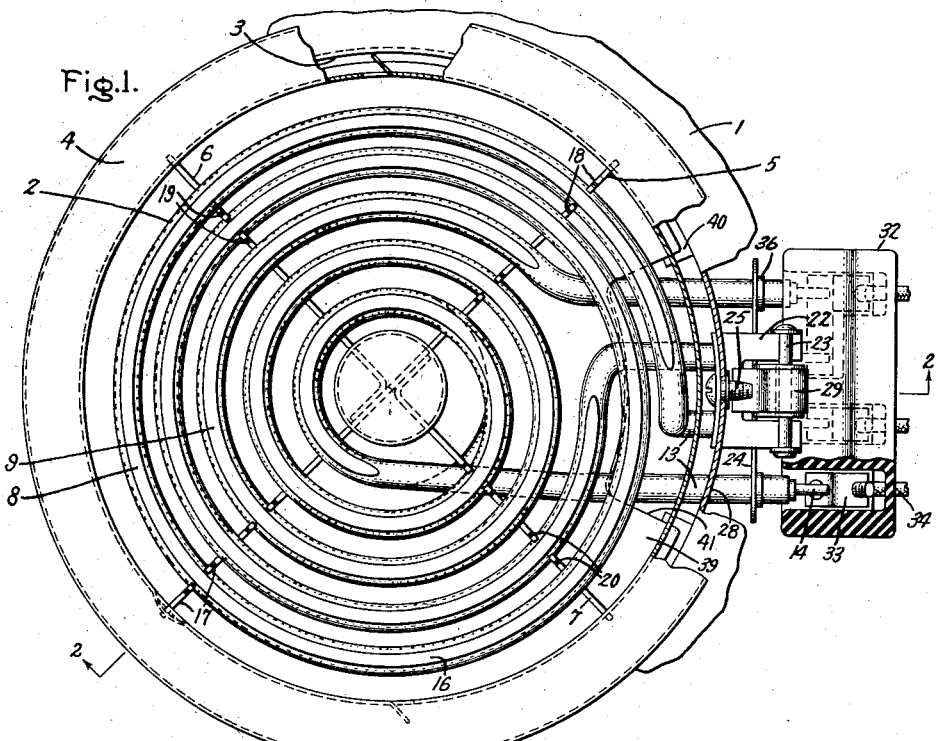
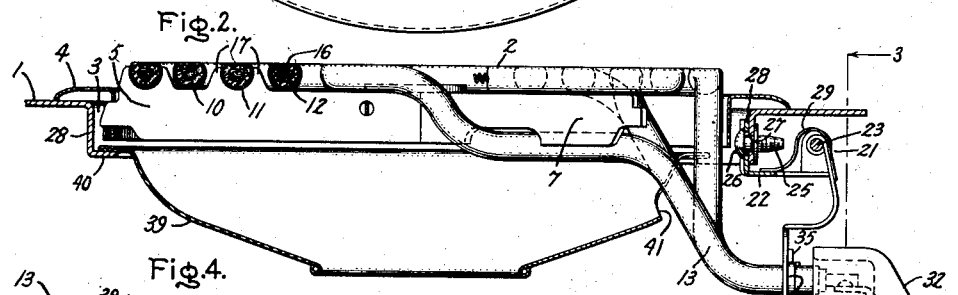
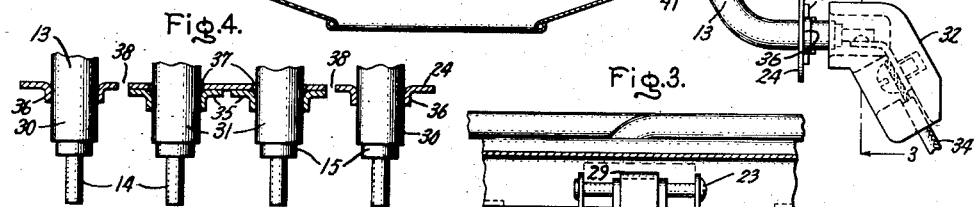
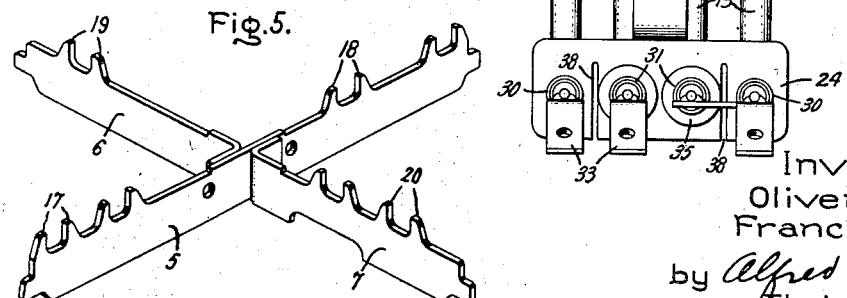
Inventors:
Oliver G. Vogel,
Francis E. Kirk,
by Alfred E. Robst
Their Attorney.

Patented Aug. 21, 1951

2,565,443

UNITED STATES PATENT OFFICE 2,565,443

ELECTRIC HOT PLATE

Oliver G. Vogel and Francis E. Kirk, Oak Park, Ill., assignors to Hotpoint Inc., Chicago, Ill., a corporation of New York Application November 4, 1947, Serial No. 783,986

11 Claims. (Cl. 219—37)

Our invention relates to electric heating devices and has particular usefulness in electric ranges or similar cooking appliances. Specific improvements, according to our invention, relate to parts and assemblies in electric ranges and in hot plates for such ranges or in hot plates apart from ranges.

Heat distribution in electric range and other hot plates is often uneven, resulting in burning or overcooking at certain spots of pans or other cooking utensils used on such hot plates. One of the objects of our invention is to improve and to equalize the distribution and transmission of heat across the bottom of cooking utensils used on hot plates.

Economical operation of electric hot plates depends upon keeping current consumption to the minimum for any given cooking job. Therefore, if lower operating temperatures of the heating elements can produce the same cooking effects which formerly required higher temperatures, this will improve the economy of operation and the durability of the heating units. Another object of our invention is to enable the use of such lower operating temperatures in electric range an other heating units.

Other objects of our invention are to gain better control of cooking through faster response to wattage changes in the heating elements, and otherwise to produce a range or hot plate having a long as well as economical life of service.

These and other objects or advantages are accomplished in the present invention by novel shaping, spacing, and mounting of the heating elements in electric hot plates, and by certain improvements in parts of the range or other structure which cooperate with the heating elements. The particular features and combinations which we regard as novel and as our invention will be understood more clearly by reference to the following description and the claims appended thereto taken in conjunction with the accompanying drawing in which Fig. 1 is a plan view of a portion of the top of an exemplary electric range with a hot plate according to our invention, parts being broken away for clarity; Fig. 2 is a sectional and partial side view taken substantially on the line 2—2 of Fig. 1; Fig. 3 is an elevation and partial section of certain terminal and supporting parts substantially on the line 3—3 of Fig. 2; Fig. 4 is a horizontal section showing details of the supporting construction for the heating unit terminals; and Fig. 5 is a perspective of the supporting members for the heating unit proper, before final assembly to other parts.

In the example shown, only part of a total electric range enclosure is indicated, and this consists of a horizontal top surface 1, usually made of sheet metal with a porcelain enamel finish. Sometimes this range top is called the cooking top. The other active parts of the range will be understood to occupy conventional relationships with respect to the cooking top excepting where otherwise indicated.

The heating element 2 occupies most of the space within an opening 3 in the cooking top and is supported above the opening by means of the flanged trim ring 4 which carries several radially extending arms, shown here as composed of a central cross piece 5 and side pieces 6 and 7. When these pieces are secured together, as by welding, they form four radially extending arms. Obviously, fewer arms might be used, or more. Three arms woudl be sufficient in same cases, but two would introduce undesirable instability of support. Four or more would be preferable, although manufacturing ease, weight, and cost usually will limit the upper number. We have found that six arms are enough for larger size hot plates. For this reason, we use the word "several" in describing the number of radial arms, to mean a number more than two, but not a large number. Of course it is not absolutely necessary that these arms extend in strict radial fashion, as long as they approximate this position by crossing under the coils of the heater.

Examining the heater, it will be noted that it is composed of a series of coils of turns of different radius, all of the coils being in the same plane. The coils are generally annular in shape. We prefer that the heating element be in the shape of a pair of nested spirally coiled units, an outer spiral 8 and an inner spiral 9. These multiple annular coils might be made in one continuous spiral piece, or in more than the two pieces shown. It will also be clear that, instead of nested spirals, there might be a plurality of interlocked spirals, or a series of concentric circular or partially circular coils.

The most important point about the coils in this heater, besides the fact that they are arranged in multiple annular flat form, is their spacing from one another. In the usual heater of multiple coil type, the spacing between adjacent coils is made as unform as possible. This would seem to insure an even distribution of heat. However, with a cooking pan or other utensil in place on the hot plate, it has been found that the heat transmitted to the utensil increases as the center of the utensil is approached, or decreases toward the edges. To correct this tendency, we have found that it is advisable to make the spacing between the coils non-uniform, and that by progressively increasing the spacing between adjacent coils from the outermost to the innermost coil of the entire assembly, the heat is distributed to a utensil in a much more uniform manner. Fig. 1 shows this progressively increasing spacing which exists not only between the coils within each spiral, but also between the inner coil or turn of the outer spiral and the outer coil or turn of the inner spiral.

The heating element itself is of any suitable construction, but we prefer an elongated element of the character patented by C. C. Abbott 1,367,341 on February 1, 1921. This has a helical resistance conductor 10 housed within a metallic sheath 11, with a highly compacted heat conducting and electrical insulating material 12, such as powdered magnesium oxide, to support the conductor in spaced relation within the sheath. The entire length of this element is made of a uniform cross-section, and care is taken that the wattage density remains constant throughout the length of the heating portion of the element. Terminal sections 13 are provided with the usual wire leads 14 which are connected to the internal resistance conductor and are insulated from the metallic sheath at its ends, as by insulating bushings 15.

To obtain the best results for even heat distribution, we have found that it is preferable to use a heating unit with a sheath of smaller cross-sectional diameter than those previously common. Whereas diameters of the order of .315" to .333" were useful in the past, we have reduced these to diameters of the order of .270". This means that a greater number of coils can be placed in the same area formerly occupied by any given size of hot plate, with more even spread of heat at less weight per watt. The active length of the coils is increased by from 49% to 67% with reduced weight, in heating units of the two sizes usually manufactured. There is less "heat mass" or ability to "store" heat, and thus the smaller diameter allows faster heat response to wattage changes.

Spacing between coils may be kept so small that even between the innermost coils, it does not exceed that of the largest cross-section diameter of the coiled elements, as shown. This close spacing, or something approaching it, gives a "solid" appearance to the unit, and increases the mechanical support of a cooking utensil placed on the hot plate.

Thermal efficiency is additionally furthered by flattening the top surfaces of the coils of the heating elements as at 16. This flattening may be done in the manner disclosed in Patent 2,094,480 which issued September 28, 1937 to O. G. Vogel and is assigned to the assignee of the present invention. This flattening, together with the increased length and number of coils, so improves the contact area and heat distribution between the unit and a cooking utensil placed thereon that the new units can operate at from 100° to 150° F. cooler than former units to perform the same cooking operations and at the same cooking wattages. Lower wattage density naturally accompanies this change.

With the improved unit, it is desirable to use the best possible support, because undue distortion of the carefully spaced turns or coils might destroy the planned effect. Therefore, we have provided the flanged trim ring and the several radial arms formed by the central cross piece and the side pieces mentioned above. The coils of the outer spiral and inner spiral rest on the arms and are maintained in flat coil form by their own weight and by attachment to these arms. However, if each coil were staked or secured to each arm at each crossing, as was common in former constructions, there would be a tendency for the coils and the arms to become stressed and distorted, because of expansion and contraction of the coils as they are heated and cooled. Some radial movement of the coils should be made possible in order to defeat this stressing and distortion. On the other hand, unlimited radial movement of the coils is almost equally undesirable and some attachment between coils and supporting structure is desirable to provide a convenient and durable unit assembly. We have found that staking the coils at selected points on the arms will give the desirable latitude of movement for expansion and contraction, while maintaining satisfactory positioning of the coils with respect to each other and with respect to the assembly as a whole. In selecting the staking points, we have avoided securing any single coil oftener than every alternate arm on the support, and have avoided staking points on any single arm oftener than every alternate coil of either spiral separately or oftener than every alternate coil of the whole nested spiral assembly.

For staking, we have illustrated pairs of lugs on the central cross piece at 17 and 18, and pairs of lugs 19 and 20 on the side pieces. Fig. 5 shows the shape of the lugs before assembly and staking. After assembly of the coils on the arms, the tips of these pairs of lugs may be staked or bent toward each other to secure the coils against radial movement at the selected points, as shown best in Fig. 2. Between these pairs of lugs, the coils are free to expand and contract radially, sliding on the arms to a limited extent. Optionally, this construction lends itself to preforming of the tips of some of the lug pairs in the manner of the patent to O. G. Vogel 2,357,150 which issued August 29, 1944 to the same assignee as the present application. Because only the outer coil of each spiral is secured between the lug pairs 17, these lugs may be formed and used in the manner taught by the Vogel patent, with the tips of only the remaining lugs bent over after final positioning of the coils and arms.

For ease and safety in use, cleaning, repair, or replacement, the entire assembly of trim ring, arms, and heater coils may be hinged and grounded to the cooking top as at 21. The hinge consists of a bracket 22, a hinge pin 23 and a terminal shield or plate 24. The bracket is shown as adjustably and removably secured to the cooking top, for instance by a self-tapping screw 25 and a slot or opening 26 in the bracket. The screw is threaded into a hole 27 in a flange 28 which surrounds the opening 3. Between the bracket and the terminal shield piece, a flexible resilient ground strap 29 extends, being preferably brazed or welded to both of these pieces. The shield or plate 24 supports the ends 30 and 31 of terminal sections 13 of the heating elements, thereby permitting the hot plate assembly to be hinged to the cooking top. An electrically insulating shield or terminal block 32 covers the terminal ends and their connection straps 33, which are suitably connected by wires 34 to the customary switches or other controls for obtaining desired degrees of heat in the resistance elements of the heater coils. The hinge and ground strap construction described here is the subject of an application, Serial No. 783,961, filed November 4, 1947, by Francis E. Kirk, and assigned to the assignee of the present invention.

Expansion and contraction of the elements or coils that make up the spirals 8 and 9 will tend to produce movement of the terminal section ends 30 and 31. Because these ends are used to connect and position the heating unit with respect to the cooking top through the hinge, provision should be made to avoid stresses or distortion in these parts of the assembly as well as in the heating unit itself. We have illustrated a combination of the structure which allows for expansion and contraction with a structure which prevents spillage from reaching the terminals.

It will be noted that the terminal ends are supported below the top of the range and well to one side of the opening 3 in the top. This not only facilitates the hinging action described, but also places the terminal ends well away from spillage or drippings from cooking utensils placed on the hot plate. Further to prevent liquids from reaching the terminals, we provide splash guards in the form of flanged rings 35 which are firmly staked around the sheath at the terminal ends 31. A similar staking of flanges 36 of the terminal shield 24 around the sheathes of terminal ends 30 prevents liquids from reaching these terminal ends and assures positive electrical connection between these parts for grounding. Terminals 31 can slide through holes 37 in the shield plate upon expansion and contraction of the heater section to which these terminals are connected. This obviates stresses and strains at these mounting points, while maintaining a spillage seal by means of the splash guards.

Because the ends 30 are firmly staked to the supporting terminal shield or plate, expansion and contraction at these points is provided for in a different manner. We have shown slots 38 in the plate, which permit relative movement between the terminals 30, each to the other, with respect to the terminals 31, and with respect to the heating unit sections. The flexible and resilient nature of the shield or plate 24 permits this relative movement without undue stress or strain on the parts.

A heat reflecting drip pan 39 is removably seated within the inwardly turned flange 40, which is attached to the flange 28 around the opening in the cooking top. A notch 41 in the edge of the reflector pan permits clearance with the terminals of the heating elements and allows removal of the reflector for cleaning when the unit has been raised. This is similar to constructions of Reissue Patent 22,177, issued September 8, 1942 to J. C. Sharp and assigned to the assignee of the present invention.

As will be evident from the foregoing description, certain aspects of our invention are not limited to the particular details of construction of the exemplary embodiment illustrated, and we contemplate that various modifications and applications of the invention will suggest themselves to one skilled in the art. It is our intention, therefore, that the appended claims shall cover such modifications and other applications as do not depart from the true spirit and scope of our present invention.

What we claim as new and desire to secure by Letters Patent of the United States is:

1. An electric range comprising a range top having an opening therein, an elongated heating element in substantially annular multiple coil flat form, each coil being spaced radially from its adjacent coil, the space between adjacent coils progressively increasing from the outermost to the innermost coil, a support for said heating element including several radially extending arms on which the coils are adapted to rest within the range top opening, means for mounting said coils on said arms for limiting radial movement of the coils at selected points only, terminal sections on said heating element extending downwardly to a level below the range top and outwardly to ends outside the area of the range top opening, a supporting plate for the terminal section ends suspended under the range top, and means for mounting said terminal section ends in said plate for limited guided movement of the terminal ends with respect to each other and with respect to the heating element as a whole.

2. An electric range comprising a range top having an opening therein, an elongated heating element in substantially annular multiple coil flat form, each coil being spaced radially from its adjacent coil, the space between adjacent coils progressively increasing from the outermost to the innermost coil, a support for said heating element including several radially extending arms on which the coils are adapted to rest within the range top opening, means for mounting said coils on said arms for limiting radial movement of the coils at selected points only, terminal sections on said heating element below the range top, a supporting plate for the terminals suspended below the range top, and means for mounting said terminal sections in said plate for limited guided movement of the terminals with respect to each other and with respect to the heating element as a whole.

3. An electric range comprising a range top having an opening therein, an elongated heating element in substantially annular multiple coil flat form, each coil being spaced radially from its adjacent coil, a support for said heating element including several radially extending arms on which the coils are adapted to rest within the range top opening, spaced lugs on said arms for engaging and limiting radial movement of the coils at selected points only, said lugs being located to engage each coil but not oftener than every alternate arm on said support for any single coil and not oftener than every alternate coil on any single arm of said support, terminal sections on said heating element extending downwardly to a level below the range top and outwardly to ends outside the area of the range top opening, and a support for the terminal section ends suspended under the range top.

4. An electric range comprising a range top having an opening therein, an elongated heating element in substantially annular multiple coil form, each coil being spaced radially from its adjacent coil, a support for said heating element within the range top opening, terminal sections on said heating element extending downwardly to a level below the range top and outwardly to ends outside the area of the range top opening, a supporting plate for the terminal section ends suspended under the range top, and a floating guide mounting in said plate for said terminal section ends such that limited guided movement of the terminal ends with respect to each other and with respect to the heating element as a whole is permitted, said mounting including a rigid connection between said plate and one of said terminal section ends and a sliding connection between said plate and another of said terminal section ends.

5. An electric range comprising a range top having an opening therein, an elongated heating element in substantially annular multiple coil flat form, each coil being spaced radially from its adjacent coil by a distance not greater than the largest sectional dimension of a coil, the space between adjacent coils progressively increasing from the outermost to the innermost coil, a support for said heating element including several radially extending arms on which the coils are adapted to rest within the range top opening, means for mounting said coils on said arms for restraining radial movement of the coils at selected points only, terminal sections on said heating element extending downwardly to a level below the range top and outwardly to ends outside the area of the range top opening, a supporting plate for the terminal section ends suspended under the range top, and means for mounting said terminal section ends in said plate for limited guided movement of the terminal ends with respect to each other and with respect to the heating element as a whole.

6. A hot plate unit comprising an elongated heating element in substantially annular multiple coil flat form, each coil being spaced radially from its adjacent coil, the space between adjacent coils progressively increasing from the outermost to the innermost coil, a support for said coiled element including several radially extending arms on which the coils are adapted to rest, and spaced lugs on said arms for engaging and limiting radial movement of the coils of the element at selected points only, said lugs being located to engage each coil but not oftener than every alternate arm on said support for any single coil and not oftener than every alternate coil on any single arm of said support.

7. A hot plate unit adapted to fit an opening on a range surface, comprising an elongated heating element in substantially annular multiple coil flat form, each coil being spaced radially from its adjacent coil, the space between adjacent coils progressively increasing from the outermost to the innermost coil, a support for said heating element within the range surface opening, terminal sections on said heating element below the range surface, a supporting plate for the terminals suspended below the range surface, and a floating guide mounting in said plate for said terminal section such that limited guided movement of the terminals with respect to each other and with respect to the heating element as a whole is permitted.

8. A hot plate unit adapted to fit an opening on a range surface, comprising an elongated heating element in substantially annular multiple coil form, each coil being spaced radially from its adjacent coil, a support for said element within the range surface opening including several radially extending arms on which the coils are adapted to rest, and spaced lugs on said arms for engaging and limiting radial movement of the coils of the element at selected points only, said lugs being located to engage each coil but not oftener than every alternate arm on said support for any single coil, terminal sections on said element below the range surface, a supporting plate for the terminals suspended below the range surface, and a floating guide mounting in said plate such that limited guided movement of said terminals with respect to each other and to the element is permitted, whereby stresses on said coils, on said terminals, and on said supporting arms due to expansion and contraction are minimized.

9. A hot plate unit adapted to fit an opening on a range surface, comprising an elongated heating element in coil form, a support for said element within the range opening, terminal sections on said element extending downwardly to a level below the range surface and outwardly to ends outside the range surface opening, a supporting plate for the terminal ends suspended under the range surface at one side of the opening, and a floating guide mounting in said plate for said terminal ends such that limited guided movement of said terminal ends with respect to each other and to the element is permitted during expansion and contraction of said element, said mounting including a rigid connection between said plate and one of said terminal ends and a sliding connection between said plate and another of said terminal ends.

10. A hot plate unit comprising an elongated heating element in substantially annular multiple coil form, each coil being spaced radially from its adjacent coil, a support for said element including several radially extending arms on which the coils are adapted to rest, and spaced lugs on said arms for engaging and limiting radial movement of the coils of the element at selected points only, said lugs being located to engage each coil but not oftener than every alternate arm on said support for any single coil and not oftener than every alternate coil on any single arm of the support, whereby stresses on said coils and on said arms due to expansion and contraction are minimized.

11. A hot plate unit adapted to fit an opening on a range surface, comprising an elongated heating element in coil form, a support for said element within the range opening, terminal sections on said element below the range surface, a flexible supporting plate for the terminals suspended below the range surface, said plate having a slot therein extending from one edge thereof and holes therein for the reception of said terminals on either side of said slot, and means to fasten at least one of said terminals securely within its hole in the supporting plate, said slot accommodating relative movements of the portions of said plate disposed on opposite sides thereof to allow relative movements of said terminals so as to minimize stresses in said heating element due to expansion and contraction thereof.

OLIVER G. VOGEL.
FRANCIS E. KIRK.

REFERENCES CITED

The following references are of record in the file of this patent:

UNITED STATES PATENTS

| Number | Name | Date |
| --- | --- | --- |
| 1,036,612 | Hadaway | Aug. 27, 1912 |
| 2,271,977 | Hjelmgren | Feb. 3, 1942 |
| 2,357,150 | Vogel | Aug. 29, 1944 |
| 2,413,477 | Wiegand | Dec. 31, 1946 |
| 2,413,478 | Wiegand | Dec. 31, 1946 |
| 2,414,667 | Price | Jan. 21, 1947 |

FOREIGN PATENTS

| Number | Country | Date |
| --- | --- | --- |
| 469,792 | Great Britain | Aug. 3, 1937 |